US008184608B2

(12) United States Patent
Matos et al.

(10) Patent No.: US 8,184,608 B2
(45) Date of Patent: May 22, 2012

(54) SYSTEM AND METHOD FOR USING CDMA PN OFFSET TO MAINTAIN INSTRUMENT TIMING REFERENCE

(75) Inventors: Soraya J. Matos, Aloha, OR (US);
Thomas L. Kuntz, Portland, OR (US);
Thomas A. Elliot, Tigard, OR (US);
Jerry L. Young, Gresham, OR (US)

(73) Assignee: Tektronix, Inc., Beaverton, OR (US)

( * ) Notice: Subject to any disclaimer, the term of this patent is extended or adjusted under 35 U.S.C. 154(b) by 743 days.

(21) Appl. No.: 12/050,103

(22) Filed: Mar. 17, 2008

(65) Prior Publication Data
US 2009/0073951 A1    Mar. 19, 2009

Related U.S. Application Data

(60) Provisional application No. 60/908,386, filed on Mar. 27, 2007.

(51) Int. Cl.
*H04B 7/216* (2006.01)
(52) U.S. Cl. .................... 370/342; 342/357.63
(58) Field of Classification Search .......... 370/328–329, 370/331–332, 335, 338, 341–342; 342/357.71, 342/357.62–357.63
See application file for complete search history.

(56) References Cited

U.S. PATENT DOCUMENTS

| 6,208,871 | B1 * | 3/2001 | Hall et al. .................. 455/517 |
| 6,577,616 | B1 * | 6/2003 | Chaudry et al. ............. 370/342 |
| 6,590,881 | B1 * | 7/2003 | Wallace et al. .............. 370/332 |
| 6,775,252 | B1 * | 8/2004 | Bayley .......................... 370/328 |
| 6,813,257 | B1 * | 11/2004 | Emmons et al. ............. 370/335 |
| 6,839,379 | B1 * | 1/2005 | Horng et al. ................. 375/148 |
| 6,885,647 | B1 * | 4/2005 | Chung et al. ................. 370/335 |
| 6,937,872 | B2 | 8/2005 | Krasner |
| 6,982,971 | B2 * | 1/2006 | Tiedemann et al. ......... 370/333 |
| 7,162,261 | B1 * | 1/2007 | Yarkosky et al. ............ 455/513 |
| 7,197,288 | B1 * | 3/2007 | Ngan et al. ................ 455/186.1 |
| 7,373,118 | B1 * | 5/2008 | Pope ........................... 455/127.1 |

(Continued)

FOREIGN PATENT DOCUMENTS
EP    1174726 A2    1/2002
(Continued)

OTHER PUBLICATIONS

Andrew Miceli: "Wireless technician's handbook"; Jan. 1, 2003, Norwood, Artech; pp. 253-254.

*Primary Examiner* — Chi H. Pham
*Assistant Examiner* — Kevin Mew
(74) *Attorney, Agent, or Firm* — Matthew D. Rabdau; Michael A. Nelson

(57) ABSTRACT

A system and method is provided enabling identification of different PN offsets values for CDMA signals without access to a GPS signal, such as when making measurements within indoor environments. When a timing reference, such as that provided by a GPS signal, is lost, the frame boundary timestamp of the CDMA signal itself is used. The parameters of the strongest available PN offset are used. The timing error is determined and the new timing reference timestamp is estimated. The strongest PN is used as the time reference and tau is corrected for. In further embodiments, a user may be able to provide identifying information allowing the estimated timing reference timestamp to be determined even when a GPS signal was never established for providing an initial timing reference.

11 Claims, 5 Drawing Sheets

U.S. PATENT DOCUMENTS

| | | | |
|---|---|---|---|
| 7,437,128 B1 * | 10/2008 | Fessler et al. | 455/67.13 |
| 7,929,487 B2 * | 4/2011 | Van Wijngaarden et al. | 370/328 |
| 2002/0085627 A1 | 7/2002 | Younis | |
| 2002/0177457 A1 | 11/2002 | Uchimoto | |
| 2003/0095516 A1 * | 5/2003 | Ok et al. | 370/331 |
| 2006/0209752 A1 * | 9/2006 | Wijngaarden et al. | 370/328 |
| 2006/0244658 A1 * | 11/2006 | Abraham | 342/357.15 |
| 2007/0268853 A1 * | 11/2007 | Ma et al. | 370/328 |
| 2008/0285539 A1 * | 11/2008 | Tiedemann et al. | 370/350 |
| 2009/0310570 A1 * | 12/2009 | Smith | 370/335 |

FOREIGN PATENT DOCUMENTS

| | | |
|---|---|---|
| GB | 2373143 A | 9/2002 |
| KR | 20020034517 A | 5/2002 |
| WO | 2005/057811 A1 | 6/2005 |

* cited by examiner

SYSTEM AND METHOD FOR USING CDMA PN OFFSET TO MAINTAIN INSTRUMENT TIMING REFERENCE

CROSS-REFERENCE TO RELATED APPLICATIONS

This application claims the benefit of U.S. Provisional Application No. 60/908,386 filed on Mar. 27, 2007, entitled System and Method for Using CDMA PN Offset to Maintain Instrument Timing Reference, which application is hereby incorporated herein by reference.

BACKGROUND

Embodiments of the present invention relate to test instruments, and more particularly to portable test instruments for measuring communications signals.

Portable test instruments, such as those used in communications testing to test wireless network base stations, and transmitters, for voice, data or other communications, rely on a timing reference for certain types of measurements, or to correlate measurements in time. An available timing source that has been used for outdoor testing is a global positioning system (GPS) signal which is provided by a GPS satellite. A GPS signal is not typically available in an indoor environment. However, there is still a desire to provide testing of wireless communications systems within indoor environments.

SUMMARY

Accordingly, it would be useful to be able to identify and use an alternative timing reference. It would also be useful to be able to correlate the alternative timing reference with the GPS timing reference. An embodiment of the present method of maintaining a timing reference for a mobile communications signal is provided. A clock signal is extracted from a GPS signal. The PN offset for a BTS is measured for use in deriving a time reference. When the GPS signal is lost, a time reference is derived. In an embodiment, the strongest BTS signal available is used to provide the PN offset value and for deriving the time reference. This time reference is then used to measure other PN offsets.

In further embodiments, a subsequent BTS PN offset may be used to provide a time reference in the event that the previous BTS signal becomes lost as well. This process can be repeated as necessary to provide a time reference, and the time reference will have relate back to the original GPS time reference.

In an alternative embodiment, where no GPS value is available to begin with, a PN offset value can be provided, for example manually to provide an starting point for deriving a time reference.

DETAILED DESCRIPTION

As part of the ability to identify different PN Offset values while within indoor environments, for the CDMA family of standards, a means of obtaining a timing reference—without access to a GPS signal was needed.

In an embodiment of the present test instrument, such as the NETTEK™ YBT250 by Tektronix, Inc., the actual CDMA signal to be measured is also used to derive timing information and make the desired identification. This ability is referred to herein as PN Sync mode. While under this "PN Sync" mode, the NetTek would not have absolute timing signals, as it may experience delay from the base station's antenna to the YBT250; therefore, the received CDMA signal will not be exactly aligned with the even second clock mark of the GPS time. However, it should be good enough to identify PN Offset since the base stations are not moving and the coverage range of a base station is intentionally relatively short with respect to the base stations' relative PN Offsets. Using a known PN Offset to derive the timing reference would allow the NetTek to identify all other PN Offsets.

Figure 1:
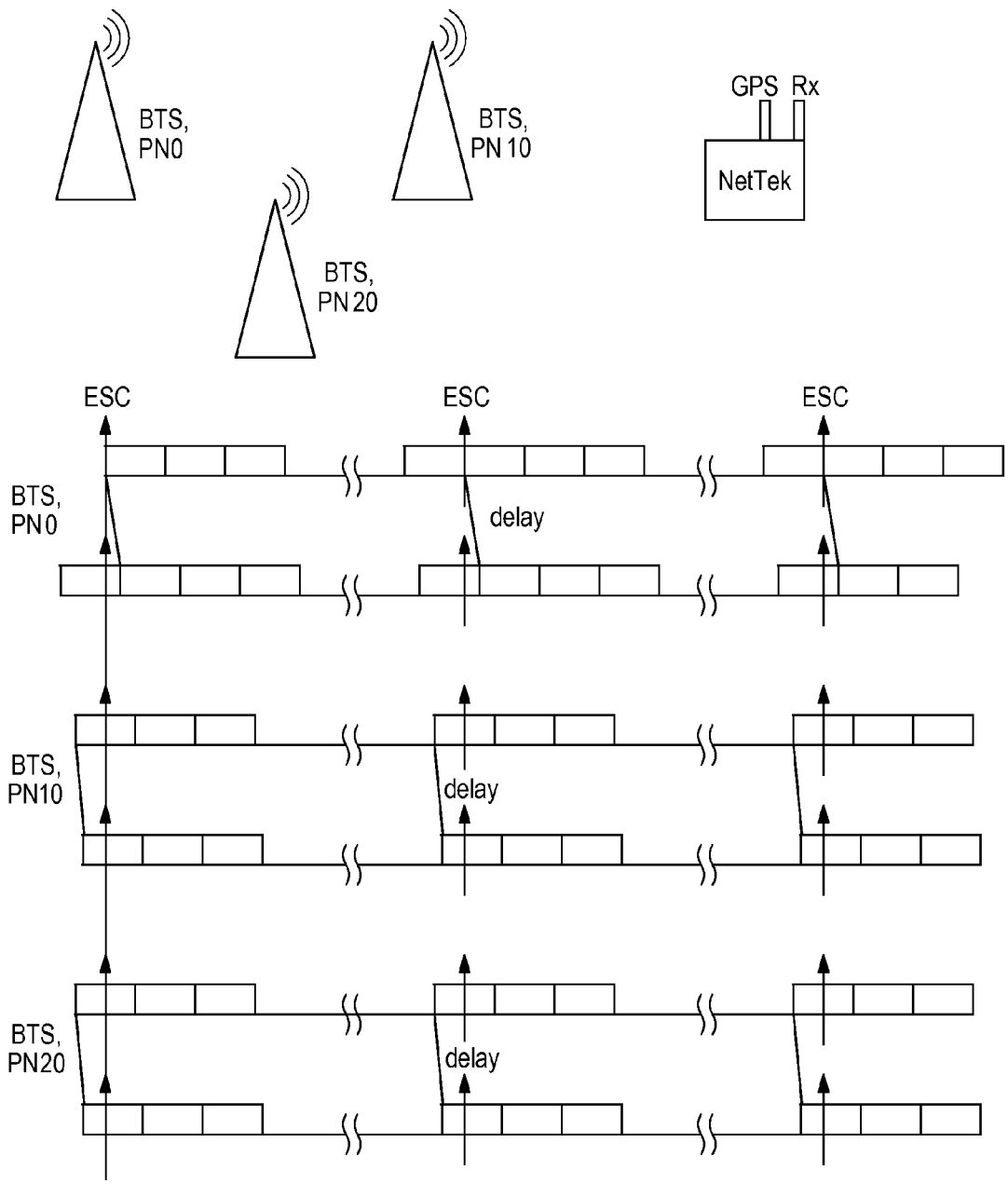
FIG. 1 shows a PN sequence of each forward link pilot referenced to the ESC of the GPS signal.

FIG. 1 shows the PN sequence of each forward link pilot referenced to the timing reference, the Even Second Clock (ESC) of the GPS signal, with offsets 0, 10, and 20 respectively at the base station and at the input of the NetTek (delayed version).

The derived timing reference will be aligned to the strongest PN offset, which corresponds to the highest-powered pilot. The tau results will be relative to the derived timing reference. Tau refers to the timing error, such as the timing error in PN chips, between the ideal and measured PN offset starting time. Therefore, tau values are not reported to the user as the values do not represent the error with respect to the CDMA timing reference.

After a GPS signal is obtained and an embodiment of a test instrument according to the present invention has measured an existing BTS, if the GPS signal is lost, the test instrument goes into a PN Sync mode. As long as the instrument continues to measure at least 1 PN offset in a reasonable amount of time, the instrument will derive its time reference from that Base Station and be able to identify other PN offsets. A reasonable amount of time corresponds to a length of time during which the drifting of the instrument's oscillator while no PN offset is measured does not cause an error in the next estimated PN offset value. In some embodiments, the instrument derive its time reference as long as the instrument continues to measure at least 1 PN offset. The estimated timing reference can be viewed as an extrapolation of the previously acquired GPS signal using the CDMA signal to correct for the drifting of the internal oscillator.

Figure 2:
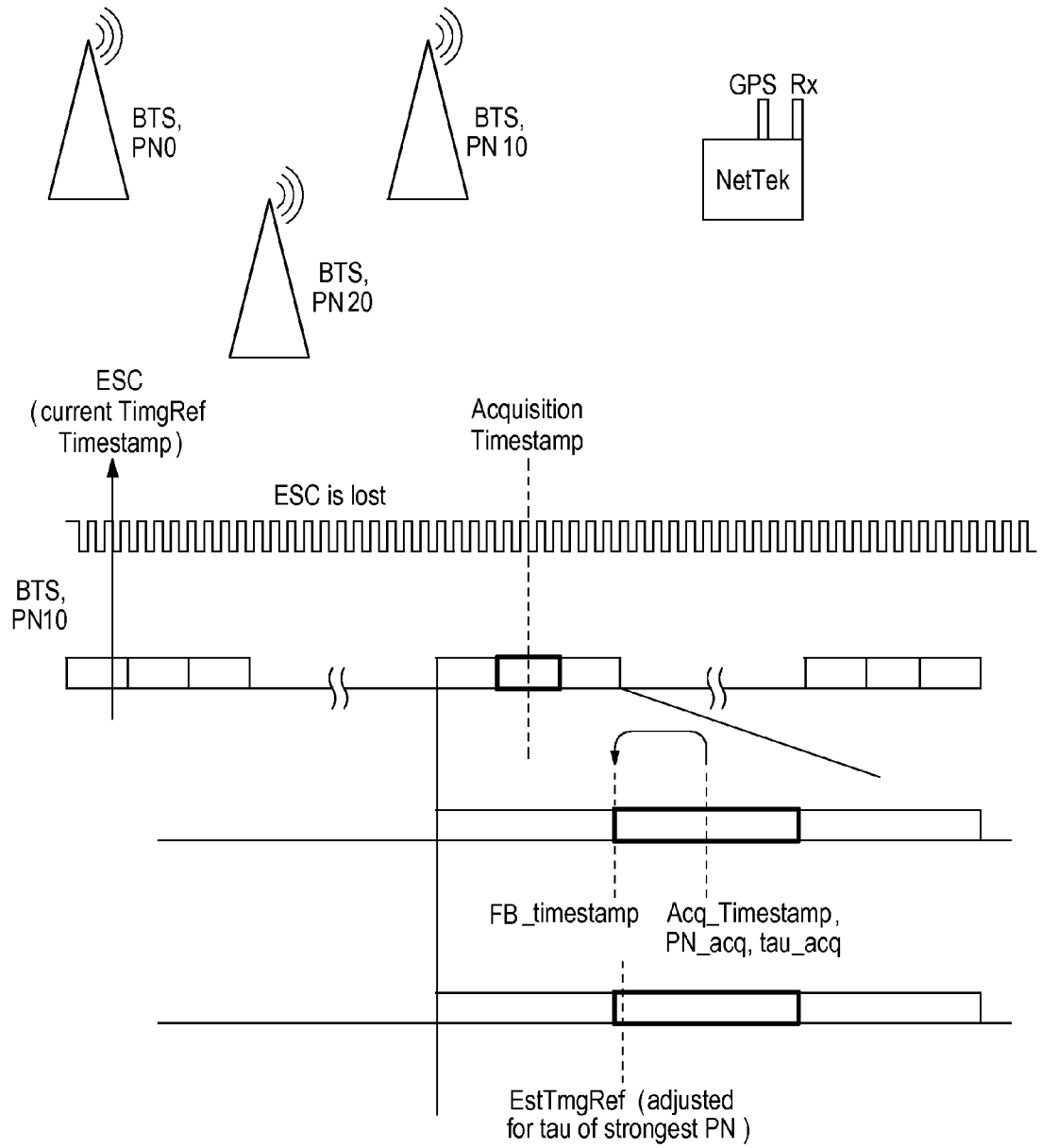
FIG. 2 shows an example where PN10 is the strongest PN and is used to estimate a new timing reference timestamp.

FIG. 2 illustrates an example where PN10 is the strongest PN, which was identified using the last ESC timing reference. The length between two timing reference marks is a multiple of the frame length. An embodiment of the present instrument corrects for the drifting of its internal oscillator by relying on the two timing references being a multiple of the frame length. This allows the instrument to maintain internal timing with sufficient precision to measure PN offsets.

In an embodiment of the present instrument, the estimated timing reference timestamp is found using the following steps:

a) Find the Frame Boundary Timestamp.
   This can be done using the acquisition timestamp, and the equivalent PN offset and tau for that timestamp.
   For any PNOS, say PNX $FB\_Timestamp=X\_Timestamp-PNOSX*K_{PN}-PNX\text{Tau}*K_{Tau}$, Where,

| | |
   |---|---|
   | FB_Timestamp | Frame boundary timestamp in clock ticks |
   | X_Timestamp | Acquisition timestamp for X in clock ticks |
   | PNOSX | PNOS for the PN sequence at the acquisition timestamp for X |
   | PNXTau | Tau, in chips, of the PN sequence at the acquisition timestamp for X |
   | $K_{PN}$ | Number of clock ticks per 64 chips |
   | $K_{Tau}$ | Number of clock ticks per chip |

Setting X to the acquisition parameters, $FB\_Timestamp=Acq\_Timestamp-PNAcq\_*K_{PN}-PNAcq\text{Tau}*K_{Tau}$ (1)

Using the parameters for the strongest PN offset, PN10 in this example, the timestamp for PN sequence at PN10 can be derived.

$FB\_Timestamp=PN10\_Timestamp-PNOS10*K_{PN}-PN10\text{Tau}*K_{Tau}$ (2)

From (1) and (2), $PN10\_Timestamp=Acq\_Timestamp+(PNOS10-PNAcq)*K_{PN}+(PN10\text{Tau}-PNAcq\text{Tau})*K_{Tau}$ b) Determine the Timing Error (TmgError)
   The distance between the frame boundary and the current timing reference should be a multiple of the frame length. If not, it is assumed to be due to internal oscillator drifting.

$Distance=(FB\_Timestamp-Current TmgRef Timestamp)$ $NumFrames=Floor(Distance/TicksPerFrame)$ $Error=Distance-NumFrames*TicksPerFrame$ $TmgError=Error/(NumFrames*TicksPerFrame)$ c) Estimate the New Timing Reference Timestamp $EstTmgRefTimestamp=CurrentTmgRefTimestamp+Distance*(1+TmgError)$ d) Use Strongest PN as the Absolute Time Reference (Correct for Tau)

$EstTmgRefTimestamp=EstTmgRefTimestamp+StrongestPN\text{Tau}*K_{Tau}$

The new estimated timing reference timestamp will be used for the next measurement, such as a scanner measurement. In this example, if PN10 continues to be the strongest PN at the same location, the measured tau will be expected to be 0, as the estimated timing reference is aligned to it. A deviation will be mainly due to internal oscillator drifting, which will be corrected in the next estimation. If the strongest PN offset changes, the next estimated timing reference will be aligned to the new strongest PN offset. The next estimated timing reference will be determined using the process outlined above.

Embodiments of this process rely on continuous measurement results to keep track of timing. PN offset values may change if the oscillator has drifted too much, for example if the oscillator has drifted significantly enough to misidentify the PN offset. If this occurs, the instrument may be moved to a location where the instrument is capable of reestablishing a GPS sync and then continue with the procedure described above.

In alternative embodiments, a Recovery PN offset process is used. In these alternative embodiments, a user will be able to enter the PN offset value of the dominant BTS, enabling the estimated timing reference stamp to be used even if a GPS lock was never established. Embodiments of the instrument derive its timing reference based upon the provided PN offset value and use it as a reference to measure other PN offset values. The first derived timing reference is estimated by taking into account the identity of the strongest PN offset, as provided by a user, for example. This embodiment is applicable to scanners capable of making relative measurement in the absence of a timing reference, such as a cdma2000 PN scanner in Tektronix' NETTEK analyzer.

The measurement process utilizes the sample index for the strongest PN offset, and the acquisition timestamp, along with the identity of the strongest PN offset, which is provided by the user in some embodiments of the present invention. Using the strongest PN sample index, and its identity, the sample index of the PN sequence can be computed. The frame boundary may be estimated using the acquisition time stamp:

$FB\_Timestamp=Acq\_Timestamp+PNSequenceSampleIndex*TicksPerSample$

This frame boundary will be used as the estimated reference time, which is aligned to the strongest PN and tau is consequently set to zero. Once a timing reference is established, embodiments of the present instrument utilize PN Sync mode.

Figure 3:
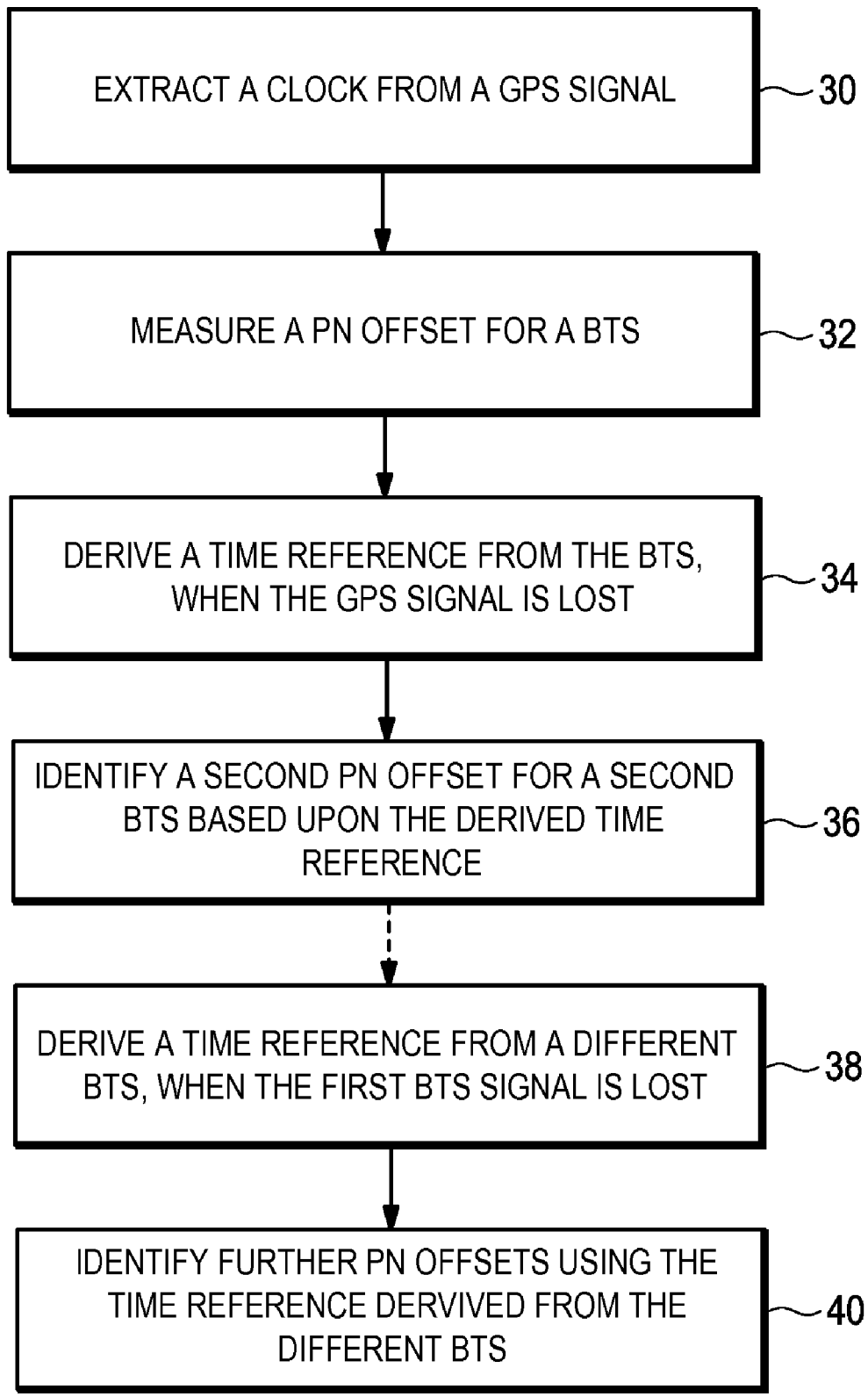
FIG. 3 is a flow diagram showing an embodiment of maintaining an instrument timing reference.

FIG. 3 is a flow diagram that illustrates the steps in an embodiment of a method according to the present invention. As shown, at step 30, a clock is extracted from a GPS signal. This clock is for example the Even Second Clock (ESC) taken from the GPS signal. A PN offset is measured for a Base Transceiver Station (BTS) as provided at step 32. When the GPS signal is lost a time reference is derived from the BTS signal, for example using the PN offset as provided at step 34. In some embodiments the derived time reference can be adjusted to account for the tau value associated with the BTS PN offset measurement. That time reference is then used to identify the PN offset of a subsequent BTS, as provided at step 36. In a further embodiment, an optional additional process may be performed in the event that the signal from the first BTS is lost. As shown at step 38, a time reference is derived from a different BTS when the first BT signal is lost and further PN offsets are identified using this derived time reference at step 40.

As each of the derived timing references relates back in a known manner to the original GPS time reference it is still possible to maintain some continuity between the various PN offset measurement that are being made, despite losing the GPS signal or losing one or more BTS signals.

Figure 4:
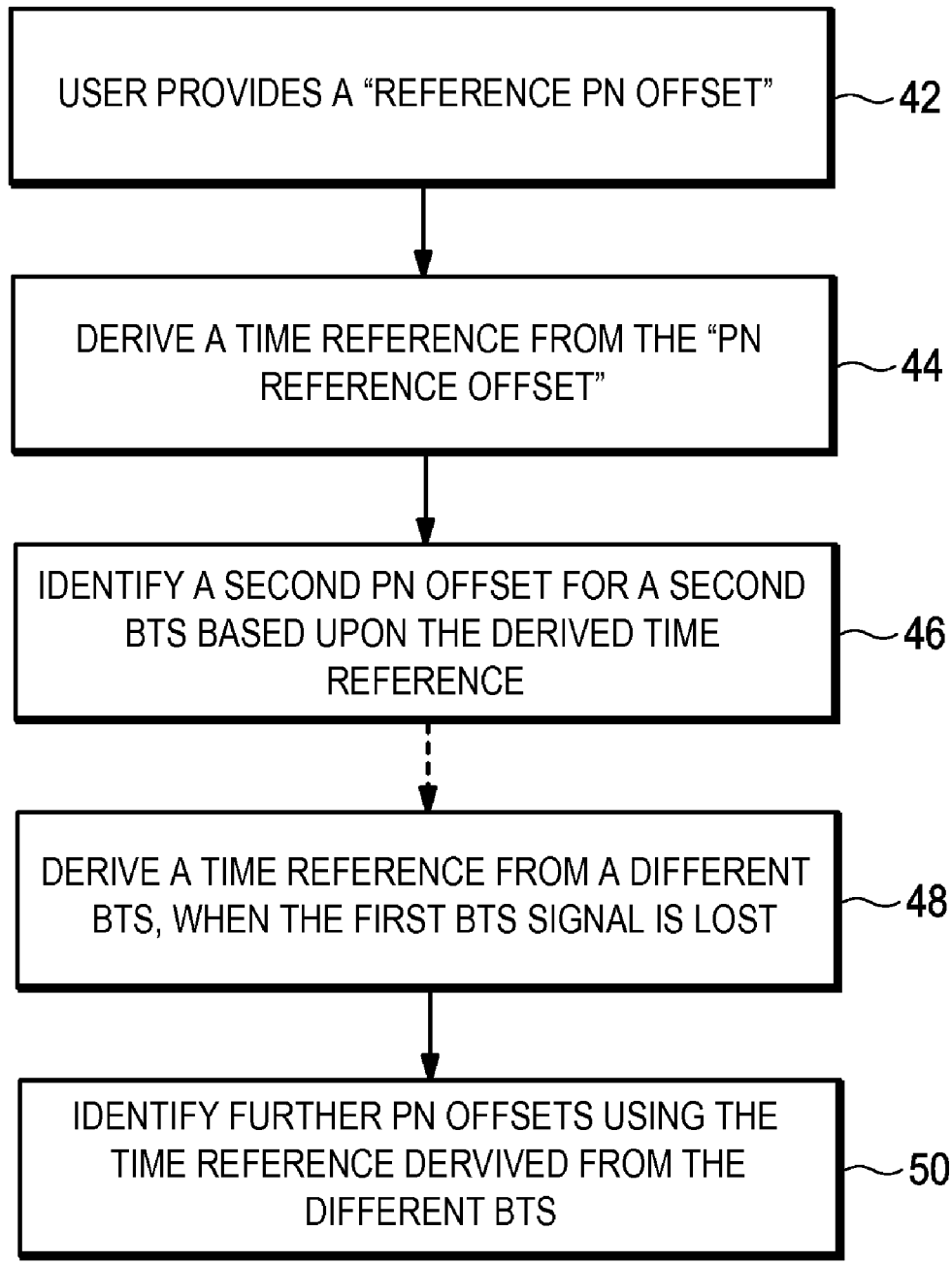
FIG. 4 is a flow diagram showing an embodiment of maintaining an instrument timing reference.

FIG. 4 is a flow diagram that illustrates the steps in an embodiment of a method according to the present invention. As shown, at step 42, a user provides a reference PN offset for a first BTS. A time reference is derived from the reference PN offset as provided at step 44. That time reference is then used to identify the PN offset of a subsequent BTS, as provided at step 46. In a further embodiment, an optional additional process may be performed in the event that the signal from the first BTS is lost. As shown at step 48, a time reference is derived from a different BTS when the first BT signal is lost and further PN offsets are identified using this derived time reference at step 50.

Figure 5:
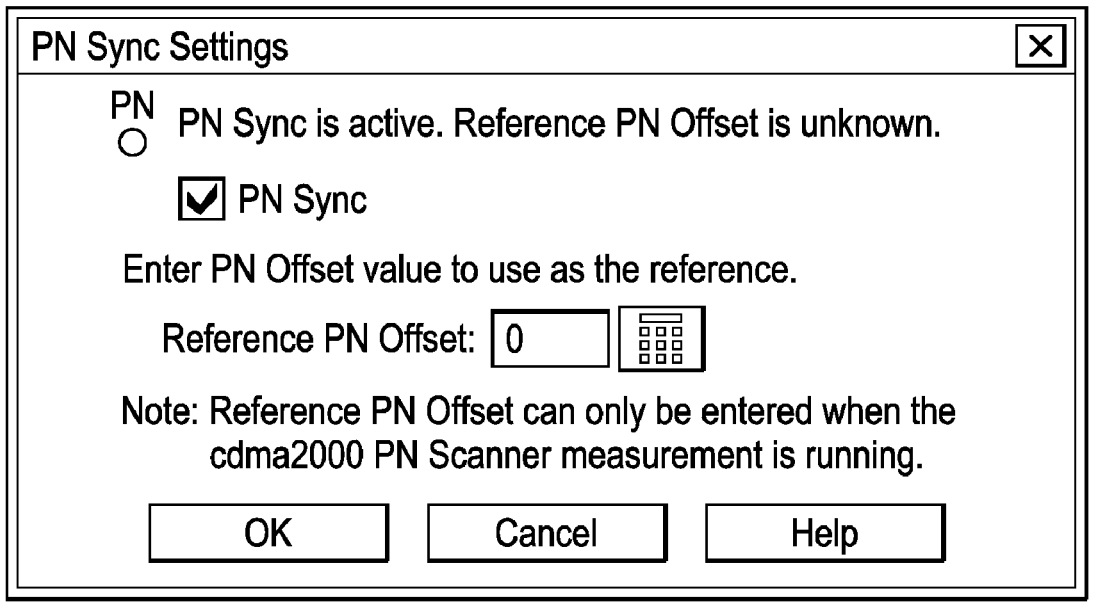
FIG. 5 illustrates a user interface for entering a reference PN offset to be used for estimating a new timing reference timestamp.

FIG. 5 shows an embodiment of a user interface enabling a user to provide the PN offset to be used as the timing reference information. For example, a user may enter the Reference PN offset that corresponds to the dominant PN in the area.

Using the CDMA signal as a timing reference will allow embodiments of the present invention to identify BTS PN offset values indoors without a GPS timing signal.

Various embodiments of the present invention have been described above by way of illustration. However, the above description should not limit the scope of the invention, which should be determined by the following claims.

What is claimed is:

1. A method of maintaining a timing reference signal for a portable test instrument comprising the steps of:
    extracting an Even Second Clock (ESC) from a global positioning system (GPS) signal as the timing reference signal;
    measuring a PN offset for a first Base Transceiver Station (BTS) signal based on the timing reference signal;
    when the portable test instrument is moved to an indoor environment and the GPS signal is lost, deriving a timing reference signal from the first BTS signal based on the PN offset of the first BTS signal as the timing reference signal; and
    identifying a PN offset for a second BTS signal based upon the derived timing reference signal.

2. The method of claim 1, wherein the first BTS signal is the strongest signal.

3. The method of claim 1, wherein a frame boundary of a CDMA signal is used when deriving the timing reference signal.

4. The method of claim 1, wherein a timing error between an ideal and a measured PN offset starting time is adjusted when deriving the timing reference signal.

5. The method of claim 1, further comprising the step of deriving a timing reference signal from the second BTS signal based on the PN offset of the second BTS signal as the timing reference signal when the first BTS signal is lost.

6. The method of claim 5, wherein the second BTS signal is the strongest signal at the time when the first BTS signal is lost.

7. A method of maintaining a timing reference signal for a portable test instrument in the absence of a global positioning system (GPS) Even Second Clock (ESC) timing reference signal comprising the steps of:
    obtaining a user-specified reference PN offset for a first Base Transceiver Station (BTS) signal;
    deriving a timing reference signal for the portable test instrument from the first BTS signal based on the user-specified reference PN offset of the first BTS signal;
    identifying a PN offset for a second BTS signal based upon the derived timing reference signal from the first BTS signal; and
    deriving a timing reference signal for the portable test instrument from the second BTS signal based on the PN offset of the second BTS signal when the first BTS signal is lost.

8. The method of claim 7, wherein the first BTS signal is the strongest signal.

9. The method of claim 7, wherein a frame boundary of a CDMA signal is used when deriving the timing reference signal from the first BTS signal.

10. The method of claim 7, wherein a timing error between an ideal and a measured PN offset starting time is adjusted when deriving the timing reference signal from the first BTS signal.

11. The method of claim 7, wherein the second BTS signal is the strongest signal at the time when the first BTS signal is lost.

* * * * *